(12) United States Patent
Cozianu et al.

(10) Patent No.: US 7,451,117 B2
(45) Date of Patent: Nov. 11, 2008

(54) SYSTEM AND METHOD FOR DIGITAL PAYMENT OF DOCUMENT PROCESSING SERVICES

(75) Inventors: Costin V. Cozianu, Irvine, CA (US); George Koppich, Irvine, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 29 days.

(21) Appl. No.: 10/952,290

(22) Filed: Sep. 28, 2004

(65) Prior Publication Data
US 2006/0069647 A1    Mar. 30, 2006

(51) Int. Cl.
*G06Q 99/00* (2006.01)
(52) U.S. Cl. .................. 705/52; 370/352; 705/26; 705/14; 705/39; 705/53
(58) Field of Classification Search .......... 705/14, 705/26, 72, 40, 53, 39, 41; 358/1.15; 235/381; 370/352
See application file for complete search history.

(56) References Cited

U.S. PATENT DOCUMENTS

| | | | |
|---|---|---|---|
| 5,903,880 A | 5/1999 | Biffar | |
| 6,047,269 A | 4/2000 | Biffar | |
| 6,205,435 B1 | 3/2001 | Biffar | |
| 6,366,893 B2 | 4/2002 | Hannula et al. | |
| 6,834,271 B1 * | 12/2004 | Hodgson et al. | 705/72 |
| 2001/0011248 A1 | 8/2001 | Himmel et al. | |
| 2001/0029488 A1 | 10/2001 | Takeshima et al. | |
| 2002/0002538 A1 | 1/2002 | Ling | |
| 2002/0077889 A1 * | 6/2002 | Kolls | 705/14 |
| 2002/0111907 A1 | 8/2002 | Ling | |
| 2002/0147658 A1 * | 10/2002 | Kwan | 705/26 |
| 2003/0151768 A1 * | 8/2003 | Iida | 358/1.15 |
| 2003/0217002 A1 | 11/2003 | Enborg | |
| 2003/0220881 A1 * | 11/2003 | Pirhonen et al. | 705/53 |
| 2004/0083173 A1 | 4/2004 | Reddihough et al. | |
| 2004/0134370 A1 | 7/2004 | Katamoto et al. | |
| 2004/0143549 A1 | 7/2004 | Likourezos | |
| 2005/0102188 A1 * | 5/2005 | Hutchison et al. | 705/26 |

OTHER PUBLICATIONS

Bill Stoneman, That bill is in the mail—the E-mail, that is, Jun. 11, 2002, American Banker, vol. 167, No. 111, p. 11A.*

* cited by examiner

*Primary Examiner*—Ella Colbert
*Assistant Examiner*—Behrang Badii
(74) *Attorney, Agent, or Firm*—Tucker Ellis & West, LLP (57) ABSTRACT

This invention is directed to a system and method for the digital payment of document processing services. More particularly, this invention is directed to a system and method which uses a pre-paid or digital payment mechanism to charge for document processing services.

16 Claims, 4 Drawing Sheets

SYSTEM AND METHOD FOR DIGITAL PAYMENT OF DOCUMENT PROCESSING SERVICES

BACKGROUND OF THE INVENTION

This invention is directed to a system and method for the digital payment of document processing services. More particularly, this invention is directed to a system and method which uses a pre-paid or digital payment mechanism to charge for document processing services.

Often users will need to generate or work with documents or other data while in a remote location or self-contained environment. These users will generally need to generate image data, by printing or scanning a document, and then to need to distribute or perform other functions on such image data. Multifunctional peripheral devices, such as printers and scanning devices, routinely perform such operations. However, such devices must typically be in data communication with a financial system or other authentication system to authorize and manage the fees associated with such document processing services. Therefore, if the multifunctional peripheral device is not connected to such system or such connection is not able to be established, the user will not be able to perform the desired document processing operations.

It is also advantageous to have a mechanism for pre-payment of document services, such as printing, that does not require a separate card, such as a pre-paid debit card. It would be advantageous if prepayment, token or credit information, were to be intimately associated with a output device driver.

Also, in a business environment, users are typically grouped into departments or other related groupings for accounting purposes. Generally, each department has a budget for document processing operations. Currently, multifunctional peripheral devices do not have the functionality to have pre-paid or defined budgets determined within the device for each department. As such, users of a certain department are able to continue to use the multifunctional peripheral device for document processing operations after the department's budget has been exhausted.

The subject invention overcomes the aforementioned problems and provides a system and method for the digital payment of document processing services.

SUMMARY OF THE INVENTION

In accordance with the present invention, there is provided a system and method for digital payment of document processing services.

Further, in accordance with the present invention, there is provided a system and method which uses a pre-paid or digital payment mechanism to charge for document processing services.

Further, in accordance with the present invention, there is provided a system and method wherein prepayment of services, such as token or credit information, were to be intimately associated with a output device driver.

Still further, in accordance with the present invention, there is provided a system and method for digital payment for document processing services which may be used in a plurality of environments.

Still further, in accordance with the present invention, there is provided a system for digital payment for document processing services. The system is comprised of means adapted for receiving digital credit data into an associated document data device and means adapted for placing the data document device in data communication with an associated document processing service. The system also comprises means adapted for selectively communicating the digital credit data from the document data device to the document processing service and means adapted for selectively communicating electronic document data from the document data device to the document processing service. The system further comprises means adapted for processing, in the document processing service, the electronic document data and means adapted for generating debit data corresponding to a cost associated with processing of the electronic document data. Preferably, the document data device is a mobile document data device, such as a laptop computer, personal digital assistant, cellular phone, or other wireless device.

In a preferred embodiment, the system further comprises means adapted for communicating the debit data to the mobile document data device so as to generate modified digital credit data reflective of the cost of processing the electronic document data. In another embodiment, the mobile document data device is comprised of a portable computing device inclusive of a print driver to which the digital credit data is appended.

In a preferred embodiment, the system further comprises means adapted for selectively communicating the debit data with an associated financial system. In one embodiment, the system comprises means adapted for selectively placing the mobile document data device in data communication with the financial system, and wherein the digital credit data is received from the financial system. In another embodiment, the system comprises means adapted for selectively placing the document processing service in data communication with the financial system, and wherein the document processing service periodically communicates debit data to the financial system.

In a preferred embodiment, the system also comprises means adapted for communicating instruction data representative of a desired document processing operation from the mobile document data device to the document processing service. Preferably, the system further comprises means adapted for communicating fee data representative of a cost for a desired document processing operation from the document processing service to the mobile document data device, means adapted for receiving order confirmation data from the mobile document data device into the document processing service, and means adapted for commencing the desired document processing operation after receipt of the confirmation data.

Still further, in accordance with the present invention, there is provided a method for digital payment for document processing services. The method comprises the steps of receiving digital credit data into an associated document data device and placing the data document device in data communication with an associated document processing service. The method also comprises the steps of selectively communicating the digital credit data from the document data device to the document processing service and selectively communicating electronic document data from the document data device to the document processing service. The method further comprises the steps of processing, in the document processing service, the electronic document data and generating debit data corresponding to a cost associated with processing of the electronic document data. Preferably, the document data device is a mobile document data device, such as a laptop computer, personal digital assistant, cellular phone, or other wireless device.

In a preferred embodiment, the method further comprises the steps of communicating the debit data to the mobile document data device so as to generate modified digital credit data reflective of the cost of processing the electronic document data. In another embodiment, the mobile document data device is comprised of a portable computing device inclusive of a print driver to which the digital credit data is appended.

In a preferred embodiment, the method also comprises the step of selectively communicating the debit data with an associated financial system. In one embodiment, the method comprises the step of selectively placing the mobile document data device in data communication with the financial system, wherein the digital credit data is received from the user financial system. In another embodiment, the method comprises the step of selectively placing the document processing service in data communication with the financial system, wherein the document processing service periodically communicates debit data to the financial system.

In a preferred embodiment, the method comprises the step of communicating instruction data representative of a desired document processing operation from the mobile document data device to the document processing service. Preferably, the method comprises the steps of communicating fee data representative of a cost for a desired document processing operation from the document processing service to the mobile document data device, receiving order confirmation data from the mobile document data device into the document processing service, and commencing the desired document processing operation after receipt of the confirmation data.

These and other aspects, advantages, and features of the present invention will be understood by one of ordinary skill in the art upon reading and understanding the specification.

BRIEF DESCRIPTION OF THE DRAWINGS

The subject invention is described with reference to certain parts, and arrangements to parts, which are evidenced in conjunction with the associated drawings, which form a part hereof and not, for the purposes of limiting the same in which.

DETAILED DESCRIPTION OF THE PREFERRED EMBODIMENT

Figure 1:
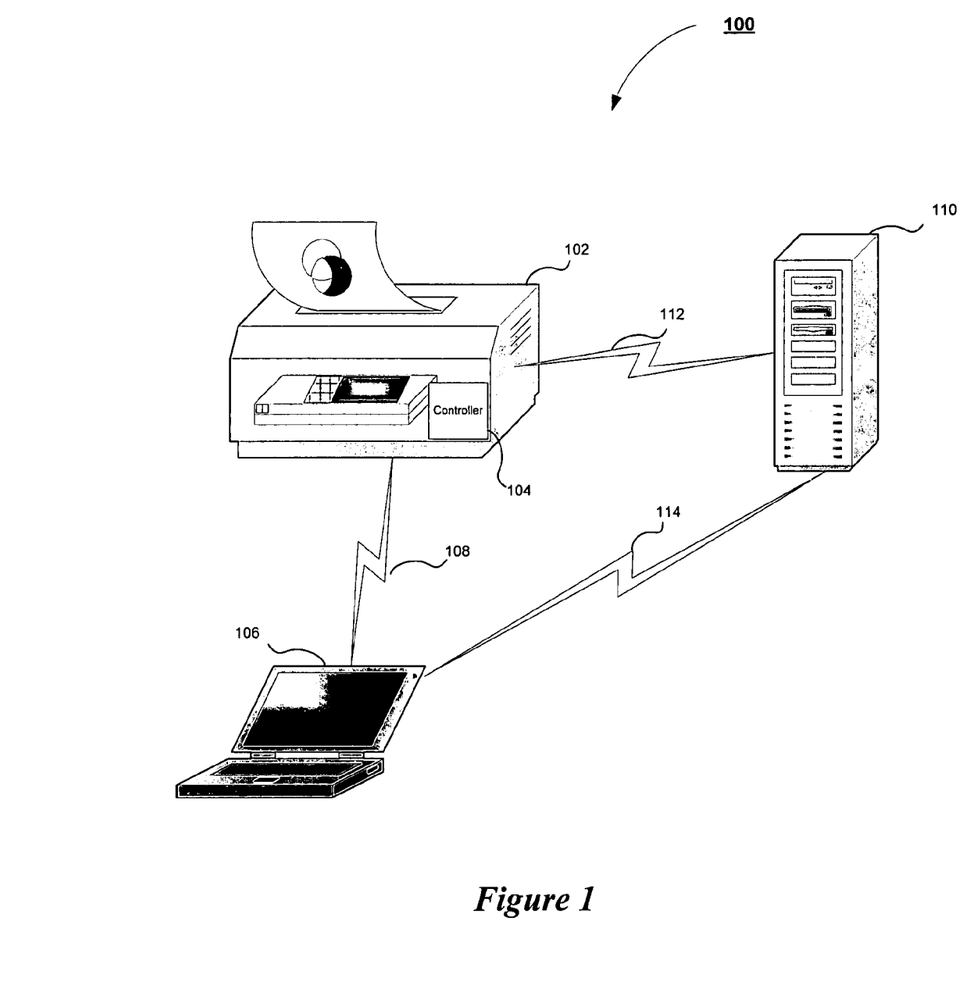
FIG. 1 is a block diagram illustrative of the system of the present invention.

This invention is directed to a system and method for digital payment of document processing services. In particular, this invention is directed to a system and method which provides a pre-paid or digital payment mechanism for document processing services in a plurality of environments. A diagram illustrating the system 100 is shown in FIG. 1. In the present invention, a user is provided access to a document processing device or service 102. Preferably, the document processing service or device is an image generating device as known in the art. Preferably, the image generating device is a scanning device, a copying device, a facsimile device, or a multifunctional peripheral device. More preferably, the image generating device is a multifunctional peripheral device. Suitable commercially available image generating devices include, but are not limited to, the Toshiba e-Studio Series Controller. The image generating device further comprises a controller 104 which controls the functions of the image generating device.

In one embodiment, the user is provided access to such multifunctional peripheral device in a remote location or self-contained environment, such as an airport lounge or business center. In another embodiment, the user is provided access to such multifunctional peripheral device within an office or work environment and the user is part of a department or other group of users sharing the device.

The user accesses the multifunctional peripheral device 102 via a computer or document data device 106 via a suitable communication link 108. In another embodiment, the user accesses the multifunctional peripheral device via a mobile or wireless device and connects using at least one of Blue-Tooth™ standard, 802.11(x) and other 802.11 compliant devices. The multifunctional peripheral device is connected to an associated financial server or system 110 via a suitable communication link 112, such as the Internet. The computer or document data device 106 is also in data communication with the financial server via a suitable communication link 114. It is understood by one of skill in the art that neither the multifunctional peripheral device or the computer have to be in continuous data communication with the financial server in order for the present invention to effectively function. Either or both the multifunctional peripheral device and the document data device are suitably communicate with the financial server intermittently, transmitting and receiving information in batch mode.

The document data device includes a digital fund store or associated database containing information relating to the digital funds allocated to the document data device. The digital fund store manages the digital funds associated with the document data device, debiting or crediting the fund as required.

The user is then provided with information about the services available to be performed. The information is provided in any suitable manner known in the art. The services provided to the user are those typically provided by multifunctional peripheral devices and associated software. For example, the system allows the user to generate or receive image data using the multifunctional peripheral device, store or archive image data in an associated repository, or distribute the image data to at least one selected destination.

Figure 2:
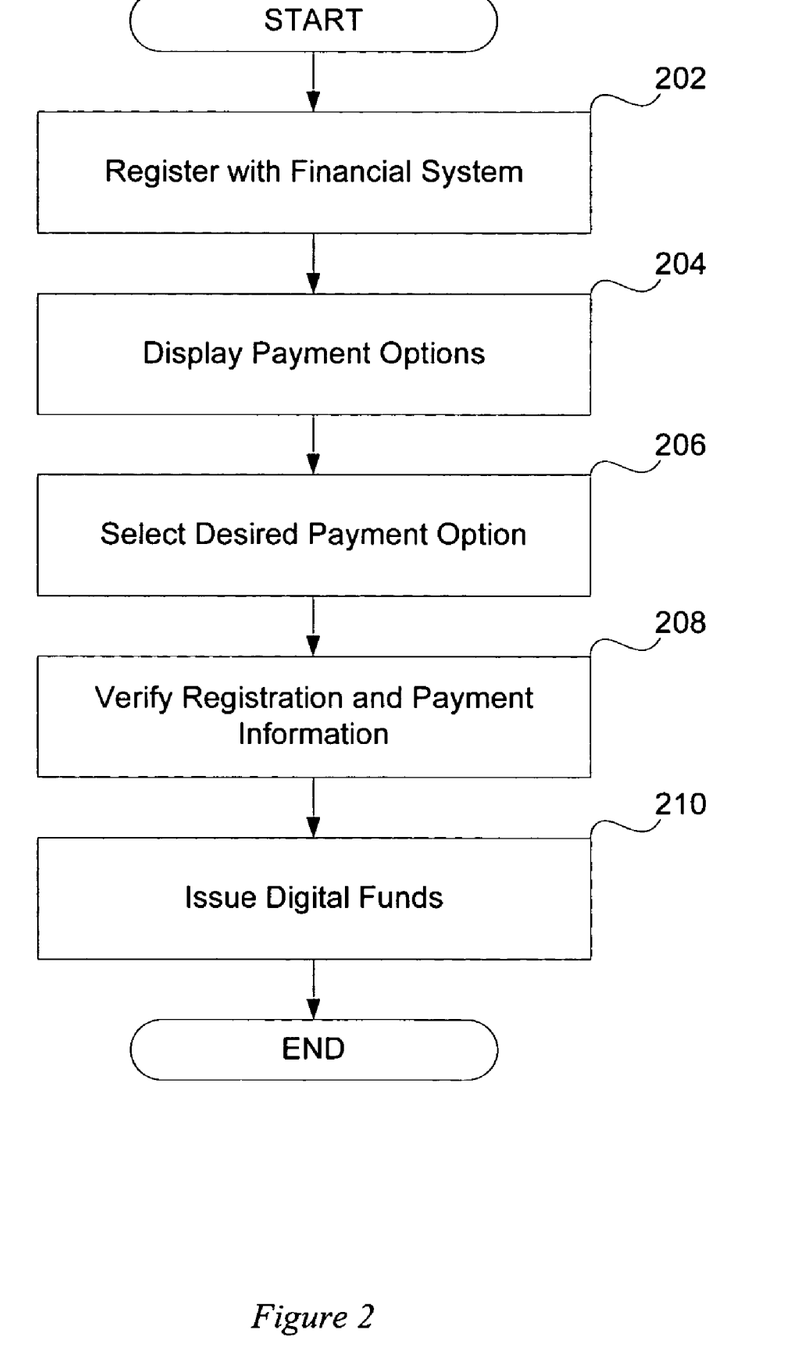
FIG. 2 is a flowchart illustrating the payment registration process according to the present invention.

FIG. 2 is a flowchart illustrating the payment registration process according to the present invention. At 202, the user registers with the financial system via any suitable means. Preferably, the user access the financial system via a communications link via a suitable user interface on the document data device. At 204, the user is provided with information about the available payment options for paying for the desired services. At 206, the user then selects the desired payment option from the options provided as well as any other required information, such as user name, password, and the like, and the information is transmitted to the financial system. Such information is provided by the central server or the point of sale server to the credit card company by any suitable method known in the art. Given that sensitive information is being transmitted, a suitable security encryption or authentication system is used, as will be readily appreciated by one of skill in the art.

At 208, the information received by the financial system is reviewed for authentication and approval. The authentication of the information and the approval is provided by any suitable method known in the art. Preferably, the user is informed of the status of the approval. Preferably, if the transaction is not approved, the user is requested to submit additional information. Upon authentication and approval, the financial system issues digital funds of the type and amount requested and transmits such funds to the user via the document data device as shown at 210. Preferably, the digital funds bear the cryptographic signature of the financial system and will be recognizable by the document processing system without further intervention or assistance from the financial system.

In a preferred embodiment, the digital funds are stored in encrypted form directly on a memory of a document data device. By way of example, such information is suitably stored as an encrypted file on a hard drive of a portable computer, in non-volatile RAM of a personal digital assistant, or in memory of a cellular telephone. In the preferred embodiment, this information is associated with an output driver used to interface such document data device with the image generating device for which service charges will be incurred. Preferably, the digital funds are advantageously incorporated into the associated driver of the image generating device. In this fashion, the information is transparently and efficiently communicated between the document data device and image generating device during document processing operations.

Figure 3:
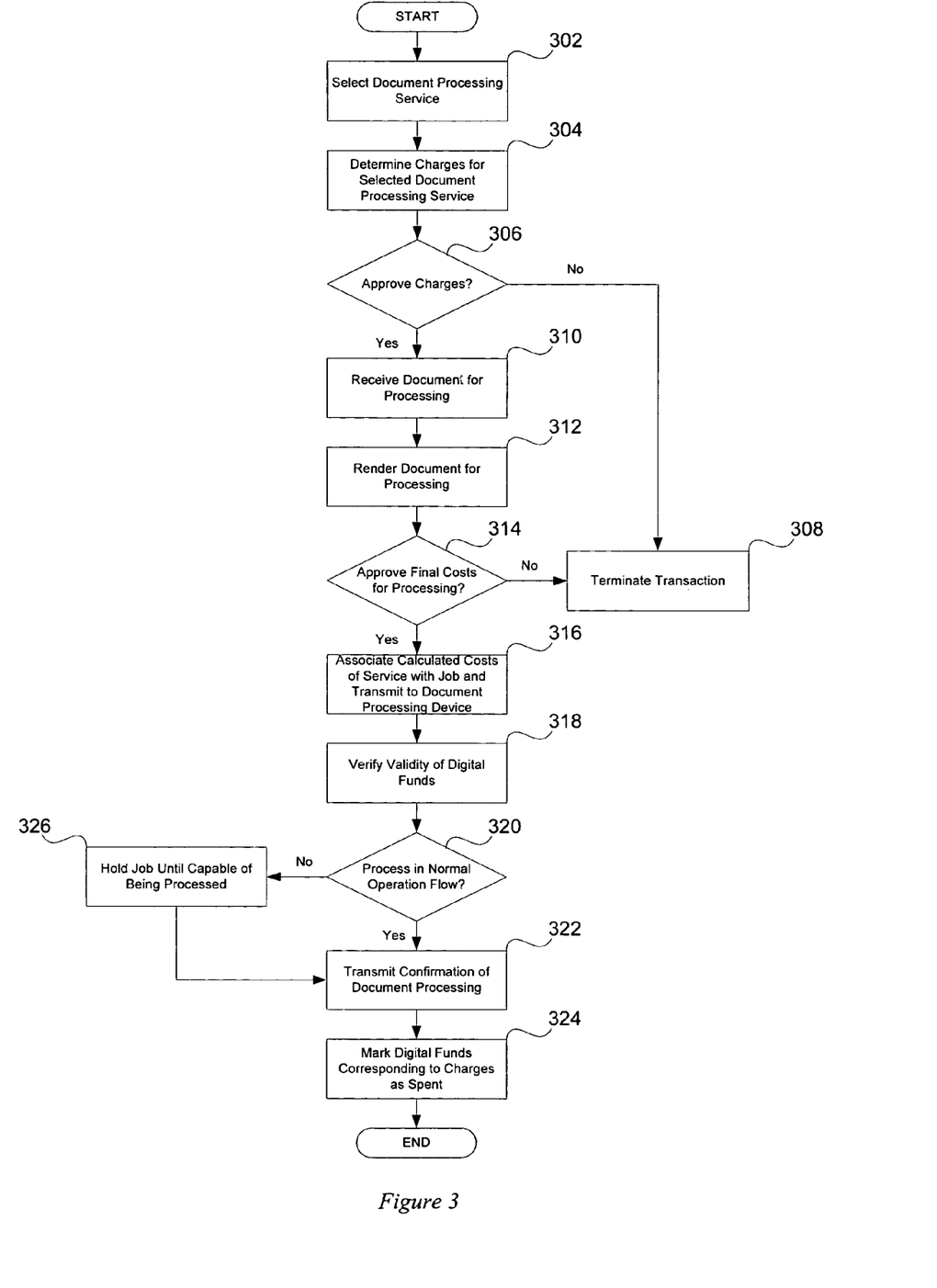
FIG. 3 is a flowchart illustrating the document processing operation according to the present invention.

FIG. 3 is a flowchart illustrating the document processing operation according to the present invention. At 302, the user requests a selected document processing service for a document via any suitable means. Preferably, the user selects the document and the processing service via a suitable user interface associated with the document data device. At 304, the system determines the appropriate charges for the service via any suitable means and presents the charges to the user via any suitable means for user approval. At 306, a determination is made whether the user approves the cost of the service. If the user does not approve the cost of the service, flow proceeds to 308, wherein the transaction is terminated.

If the user approves the cost, flow proceeds to 310 wherein the document is received at the multifunctional peripheral device via any suitable means. For example, the document is suitably transmitted from the document data device via suitable means, accessed from a storage repository associated with the multifunctional peripheral device, or generated at the multifunctional peripheral device. The document is then rendered for processing via suitable means known in the art as shown at 312.

At 314, a determination is made whether the user approves the final cost of the service. If the user does not approve the final cost, flow proceeds to 308, wherein the transaction is terminated. If the user does approve the final cost, then flow proceeds to 316, wherein the document data device associates the calculated cost of the service with the document processing job data and transmits the cost information and the processing job to the multifunctional peripheral device. For example, the cost is inserted or prepended into the job header or job protocol before the job is sent and then the job with cost data in the header or protocol is sent to the multifunctional peripheral device. Preferably, the header or protocol is a non-repudiation cryptographic protocol wherein the document data device and the multifunctional peripheral device exchange non-repudiation money tokens. The digital funds to be used in the processing of the job are marked as used in digital fund store related to the document data device.

At 318, the multifunctional peripheral verifies the validity of the digital funds via suitable means. Preferably, a public certificate issued from the financial system is associated with the multifunctional peripheral device and is used to verify the validity of the digital funds. If the user requesting the services does not have funds available to complete the services requested, the funds will not be validated and the user will not be able to complete processing of the requested services. For example, if a department or workgroup has met or exceeded its document processing budget, any users of such department will not be able to request additional services until the budget is replenished. Such determination as to whether the user has sufficient funds for the service requested is also able to be made at any time prior to processing the job as will be understood by one of ordinary skill in the art.

Upon verification of the validity of the funds, a determination is made whether the job is able to be processed in the normal flow of processing operations as shown at 320. If the job is able to be processed, the multifunctional peripheral device process the jobs and sends confirmation of the processing to the document data device via suitable means as shown at 322. Once the document data device receives confirmation of the completion of the job, the digital funds are marked as spent in the digital fund store related to the document data device as shown at 324 and the transaction is completed.

In another embodiment, if the job is not processed in the normal flow of processing after verification of the funds, such as due to a malfunction in the multifunctional peripheral device or an error in the processing parameters selected, the job is suitably held until able to be processed as shown at 326. Once the document data device receives confirmation of the completion of the job, the digital funds are marked as spent in the digital fund store related to the document data device as shown at 324 and the transaction is completed.

Figure 4:
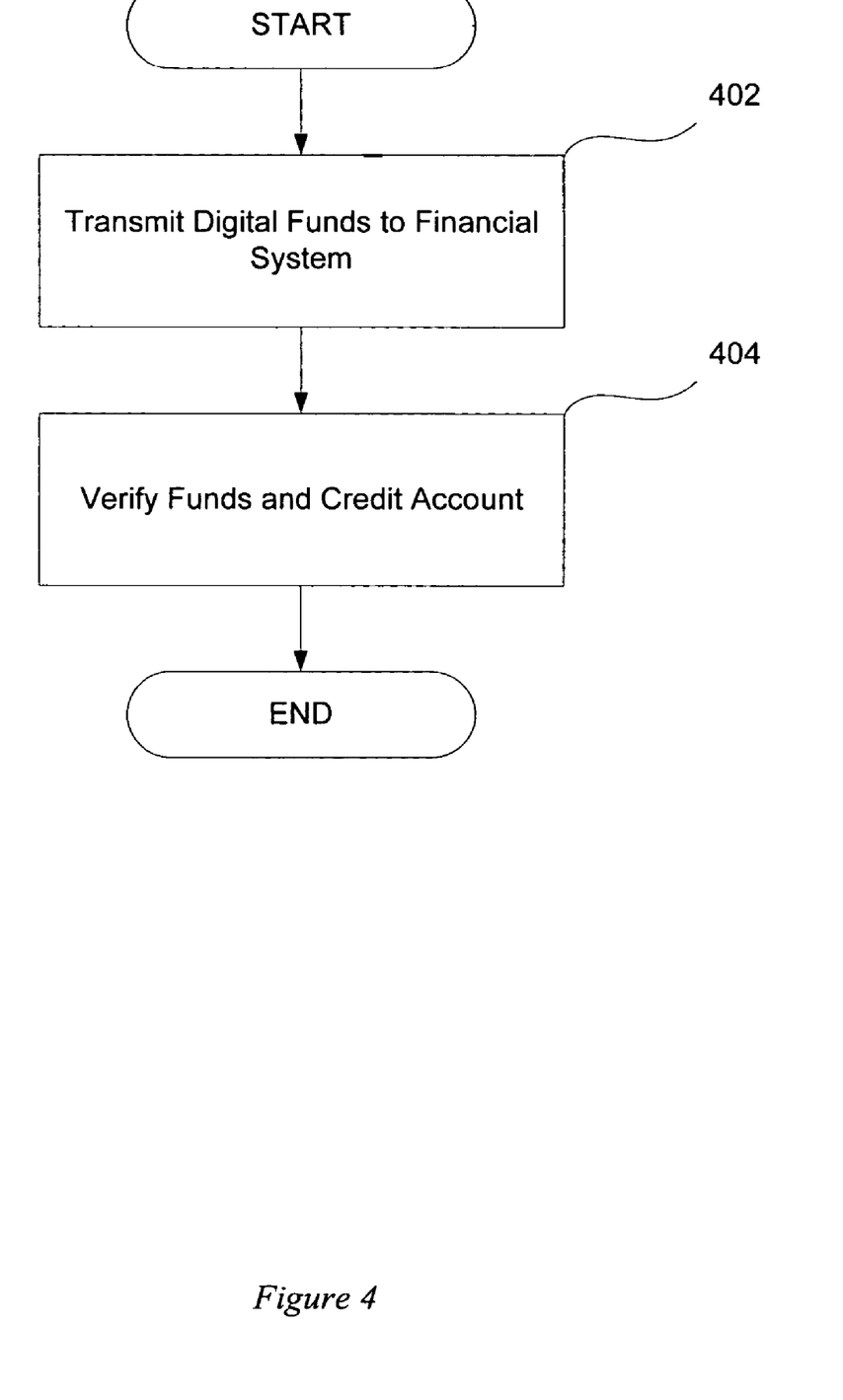
FIG. 4 is a flowchart illustrating the payment or settlement process according to the present invention.

FIG. 4 is a flowchart illustrating the settlement process according to the present invention. At 402, the multifunctional peripheral device transmits the digital funds received for services and associated information to the financial system via any suitable means. The digital funds are suitably transmitted real time or in a batch mode. Upon receipt of the digital funds, preferably the funds are verified and credited to the proper accounts as shown at 404.

While in the preferred embodiment the present invention is implemented in software, as those skilled in the art can readily appreciate it may also be implemented in hardware or a combination of software and hardware.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention.

What is claimed is:

1. A system for digital payment of document processing services comprising:
   means for opening a wireless data communication link between a portable document data device and an associated financial institution;
   means for communicating identification data from the portable document data device to the associated financial institution;
   means for selecting a payment method from a plurality thereof;
   means for selecting a credit amount representative of a desired digital credit to be associated with the portable document data device for future document processing operations to be performed therewith;
   means for receiving encoded digital credit data, which digital credit data includes data representative of the selected credit amount, into a data storage associated with a device driver disposed on the portable document data device upon approval of the selected credit amount from the associated financial institution rendered in accordance with the selected credit amount and the identification data;

means for receiving the digital credit data inclusive of certificate data representative of authenticity of the encoded digital credit data;

means for placing the portable document data device in data communication with an associated document processing service, which document processing service includes at least one of copying, printing, facsimile transmission, scanning, storage, and distribution;

means for opening at least one electronic document in an application running on the portable document data device;

means for receiving data representative of at least one selected document processing service to be performed on a selected, electronic document;

means for enabling the driver from within the application in accordance with a selected document processing service;

means for selectively communicating the digital credit data from the portable document data device to the document processing service via the driver;

means for selectively communicating the communicating the electronic document data from the portable document data device to the document processing service via the driver;

means for receiving final cost data corresponding to a cost associated with completion of the at least one selected document processing service on the electronic document data as determined by an analysis of the communicated electronic document data after communication thereof;

means for receiving authorization data for completion of the at least one selected document processing service in accordance with received final cost data and communicated digital credit data;

means for processing the at least one selected document processing service on the electronic document data in accordance with received authorization data;

means for generating debit data corresponding to a cost associated with processing of the electronic document data;

means for communicating the debit data to the portable document data device; and means for decrementing the value of the encoded digital credit data in accordance with debit data.

2. The system for digital payment of document processing services of claim 1, further comprising means for selectively communicating the debit data with an associated financial system.

3. The system for digital payment of document processing services of claim 2, wherein the device driver of the portable document data device is a print driver to which the digital credit data is appended.

4. The system for digital payment of document processing services of claim 1, wherein data representative of a desired document processing operation is communicated from the portable document data device to the document processing service.

5. A method for digital payment of document processing services comprising:

opening a wireless data communication link between a portable document data device and an associated financial institution;

communicating identification data from the portable document data device to the associated financial institution;

selecting a payment method from a plurality thereof;

selecting a credit amount representative of a desired digital credit to be associated with the portable document data device for future document processing operations to be performed therewith;

receiving encoded digital credit data, which digital credit data includes data representative of the selected credit amount, into a data storage associated with a device driver disposed on the portable document data device upon approval of the selected credit amount from the associated financial institution rendered in accordance with the selected credit amount and the identification data;

receiving the digital credit data inclusive of certificate data representative of authenticity of the encoded digital credit data;

placing the portable document data device in data communication with an associated document processing service, which document processing service includes at least one of copying, printing, facsimile transmission, scanning, storage, and distribution;

opening at least one electronic document in an application running on the portable document data device;

receiving data representative of at least one selected document processing service to be performed on a selected, electronic document;

enabling the driver from within the application in accordance with a selected document processing service;

selectively communicating the digital credit data from the portable document data device to the document processing service via the driver;

selectively communicating the electronic document data from the portable document data device to the document processing service via the driver;

receiving final cost data corresponding to a cost associated with completion of the at least one selected document processing service on the electronic document data as determined by an analysis of the communicated electronic document data after communication thereof;

receiving authorization data for completion of the at least one selected document processing service in accordance with received final cost data and communicated digital credit data;

processing the at least one selected document processing service on the electronic document data in accordance with received authorization data;

generating debit data corresponding to a cost associated with processing of the electronic document data;

communicating the debit data to the portable document data device; and decrementing the value of the encoded digital credit data in accordance with debit data.

6. The method for digital payment of document processing services of claim 5, further comprising the step of selectively communicating the debit data with an associated financial system.

7. The method for digital payment of document processing services of claim 6, wherein the device driver of the portable document data device is a print driver to which the digital credit data is appended.

8. The method for digital payment of document processing services of claim 5, wherein data representative of a desired document processing operation is communicated from the mobile document data device to the document processing service.

9. A computer-readable medium of instructions with computer readable instructions stored thereon for digital payment of document processing services comprising:

instructions for opening a wireless data communication link between a portable document data device and an associated financial institution;

instructions for communicating identification data from the portable document data device to the associated financial institution;

instructions for selecting a payment method from a plurality thereof;

instructions for selecting a credit amount representative of a desired digital credit to be associated with the portable document data device for future document processing operations to be performed therewith;

instructions for receiving encoded digital credit data, which digital credit data includes data representative of the selected credit amount, into a data storage associated with a device driver on the portable document data device upon approval of the selected credit amount from the associated financial institution rendered in accordance with the selected credit amount and the identification data;

instructions for receiving the digital credit data inclusive of certificate data representative of authenticity of the encoded digital credit data;

instructions for placing the portable document data device in data communication with an associated document processing service, which document processing service includes at least one of copying, printing, facsimile transmission, scanning, storage, and distribution;

instructions for opening at least one electronic document in an application running on the portable document data device;

instructions for receiving data representative of at least one selected document processing service to be performed on a selected, electronic document;

instructions for enabling the driver from within the application in accordance with a selected document processing service;

instructions for selectively communicating the digital credit data from the portable document data device to the document processing service via the driver;

instructions for selectively communicating electronic document data from the portable document data device to the document processing service via the driver;

instructions for receiving final cost data corresponding to a cost associated with completion of the at least one selected document processing service on the electronic document data as determined by an analysis of the communicated electronic document data after communication thereof;

instructions for receiving authorization data for completion of the at least one selected document processing service in accordance with received final cost data and communicated digital credit data;

instructions for processing the at least one selected document processing service on the electronic document data in accordance with received authorization data;

instructions for generating debit data corresponding to a cost associated with processing of the electronic document data;

instructions for communicating the debit data to the portable document data device; and     instructions for decrementing the value of the encoded digital credit data in accordance with debit data.

10. The computer-readable medium of instructions with computer-readable instructions stored thereon for digital payment of document processing services of claim 9, further comprising instructions for selectively communicating the debit data with an associated financial system.

11. The computer-readable medium of instructions with computer-readable instructions stored thereon for digital payment of document processing services of claim 10, wherein the device driver of the portable document data device is a print driver to which the digital credit data is appended.

12. The computer readable medium of instructions with computer-readable instructions stored thereon for digital payment of document processing services of claim 9, wherein data representative of a desired document processing operation is communicated from the mobile document data device to the document processing service.

13. A computer-implemented method for digital payment of document processing services comprising:

opening a wireless data communication link between a portable document data device and an associated financial institution;

communicating identification data from the portable document data device to the associated financial institution;

selecting a payment method from a plurality thereof;

selecting a credit amount representative of a desired digital credit to be associated with the portable document data device for future document processing operations to be performed therewith;

receiving encoded digital credit data, which digital credit data includes data representative of the selected credit amount, into a data storage of an associated mobile document data device upon approval of the selected credit amount from the associated financial institution rendered in accordance with the selected credit amount and the identification data;

receiving the digital credit data inclusive of certificate data representative of authenticity of the encoded digital credit data;

placing the portable document data device in data communication with an associated document processing service, which document processing service includes at least one of copying, printing, facsimile transmission, scanning, storage, and distribution;

opening at least one electronic document in an application running on the portable document data device;

receiving data representative of at least one selected document processing service to be performed on a selected, electronic document;

enabling the driver from within the application in accordance with a selected document processing service;

selectively communicating the digital credit data from the portable document data device to the document processing service via the driver;

selectively communicating the electronic document data from the portable document data device to the document processing service via the driver;

receiving final cost data corresponding to a cost associated with completion of the at least one selected document processing service on the electronic document data as determined by an analysis of the communicated electronic document data after communication thereof;

receiving authorization data for completion of the at least one selected document processing service in accordance with received final cost data and communicated digital credit data;

processing the at least one selected document processing service on the electronic document data in accordance with received authorization data;

generating debit data corresponding to a cost associated with processing of the electronic document data;

communicating the debit data to the portable document data device; and decrementing the value of the encoded digital credit data in accordance with debit data.

14. The computer-implemented method for digital payment of document processing services of claim 13, further comprising the step of selectively communicating the debit data with an associated financial system.

15. The computer-implemented method for digital payment of document processing services of claim 14, wherein the device driver of the portable document data device is a print driver to which the digital credit data is appended.

16. The computer-implemented method for digital payment of document processing services of claim 13, wherein data representative of a desired document processing operation is communicated from the portable document data device to the document processing service.

* * * * *